(12) United States Patent
Belinsky et al.

(10) Patent No.: US 9,483,576 B2
(45) Date of Patent: Nov. 1, 2016

(54) OFFLINE APPLICATION SUPPORT

(75) Inventors: Ofer Belinsky, Yehud (IL); Nadav Greenberg, Yehud (IL); Yaniv Shachar, Yehud (IL); Alon Mei-Raz, Yehud (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 443 days.

(21) Appl. No.: 13/597,638

(22) Filed: Aug. 29, 2012

(65) Prior Publication Data
US 2014/0067849 A1    Mar. 6, 2014

(51) Int. Cl.
G06F 17/30 (2006.01)
G06F 15/16 (2006.01)

(52) U.S. Cl.
CPC ................. *G06F 17/30902* (2013.01)

(58) Field of Classification Search
USPC .......................................................... 707/769
See application file for complete search history.

(56) References Cited

U.S. PATENT DOCUMENTS

| | | | |
|---|---|---|---|
| 6,604,143 B1* | 8/2003 | Nagar et al. | 709/229 |
| 8,484,314 B2* | 7/2013 | Luna et al. | 709/217 |
| 2009/0063590 A1* | 3/2009 | Yuval et al. | 707/205 |
| 2009/0228545 A1* | 9/2009 | Mendez et al. | 709/202 |
| 2011/0078322 A1* | 3/2011 | Shin et al. | 709/230 |
| 2011/0283359 A1* | 11/2011 | Prince et al. | H04L 67/146 726/23 |

OTHER PUBLICATIONS

James Pearce, Taking Sencha Touch Apps Offline, Aug. 16, 2011.*
Pearce, J., Taking Sencha Touch Apps Offline, Apr. 22, 2011, 27 pages, http://www.sencha.com/learn/taking-sencha-touch-apps-offline.
Raad, M., Thunderhead Explorer, Apr. 22, 2011, 4 pages, http://thunderheadxpler.blogspot.in/2011/10/map-tiles-for-offline-usage-using.html.

* cited by examiner

*Primary Examiner* — Alex Gofman
(74) *Attorney, Agent, or Firm* — Hewlett Packard Enterprise Development LP

(57) ABSTRACT

An offline support system operates to record a plurality of request/response pairs exchanged between an application and a web service. The system determines if a current request from the application can be communicated to the web service. Upon a positive determination, the current request is passed to the web service. Upon a negative determination, a most recent recorded request/response pair having a request matching the current request is identified. The response from the identified pair is passed to the application as if it were a response to the current request.

17 Claims, 3 Drawing Sheets

OFFLINE APPLICATION SUPPORT

BACKGROUND

Mobile devices such as smartphones and tablets have become highly popular computing platforms providing considerable computing capabilities. Many mobile applications rely on wireless network connections for accessing data from an application server. Wireless data connections become unavailable for any number of reasons and prevent timely access to important information. For example, the mobile device may be out of signal range or the user may intentionally place the device in an offline or "airplane" mode.

DRAWINGS

DETAILED DESCRIPTION

Introduction

Mobile applications installed and executing on a mobile computing device such as a smartphone or tablet often rely on the existence of a wireless data connection between the mobile device and a web service. When that connection is not available, the user can be left without access to important information. Various embodiments described below were developed to improve the user experience with such applications in situations when a stable data connection cannot be counted on.

An offline support system operates on a user's mobile device and sits between the mobile application and the device's data communication feature. The data communication feature includes the programming and hardware used by the device to transmit and receive data communications. The system maintains a repository by recording interactions between the application and a web service that pass through that data communication feature. Those interactions can be segmented into request/response pairs.

The system, upon a determination that a current request from the application cannot be communicated to a given web service, the system turns to the repository. In particular, the system uses the current request to query the repository for a most recent request/response pair having a request that matches the current request. That pair will have a prior response returned from the web service to the mobile application in response to the matching prior request. The system then returns the prior response to the mobile application as if it were a response to the current request. In this fashion, the offline support system allows use of the mobile application regardless of whether or not a data connection is available.

The following description is broken into sections. The first, labeled "Environment," describes an environment in which various embodiments may be implemented. The second section, labeled "Components," describes examples of various physical and logical components for implementing various embodiments. The third section, labeled as "Operation," describes steps taken to implement various embodiments.

Figure 1:
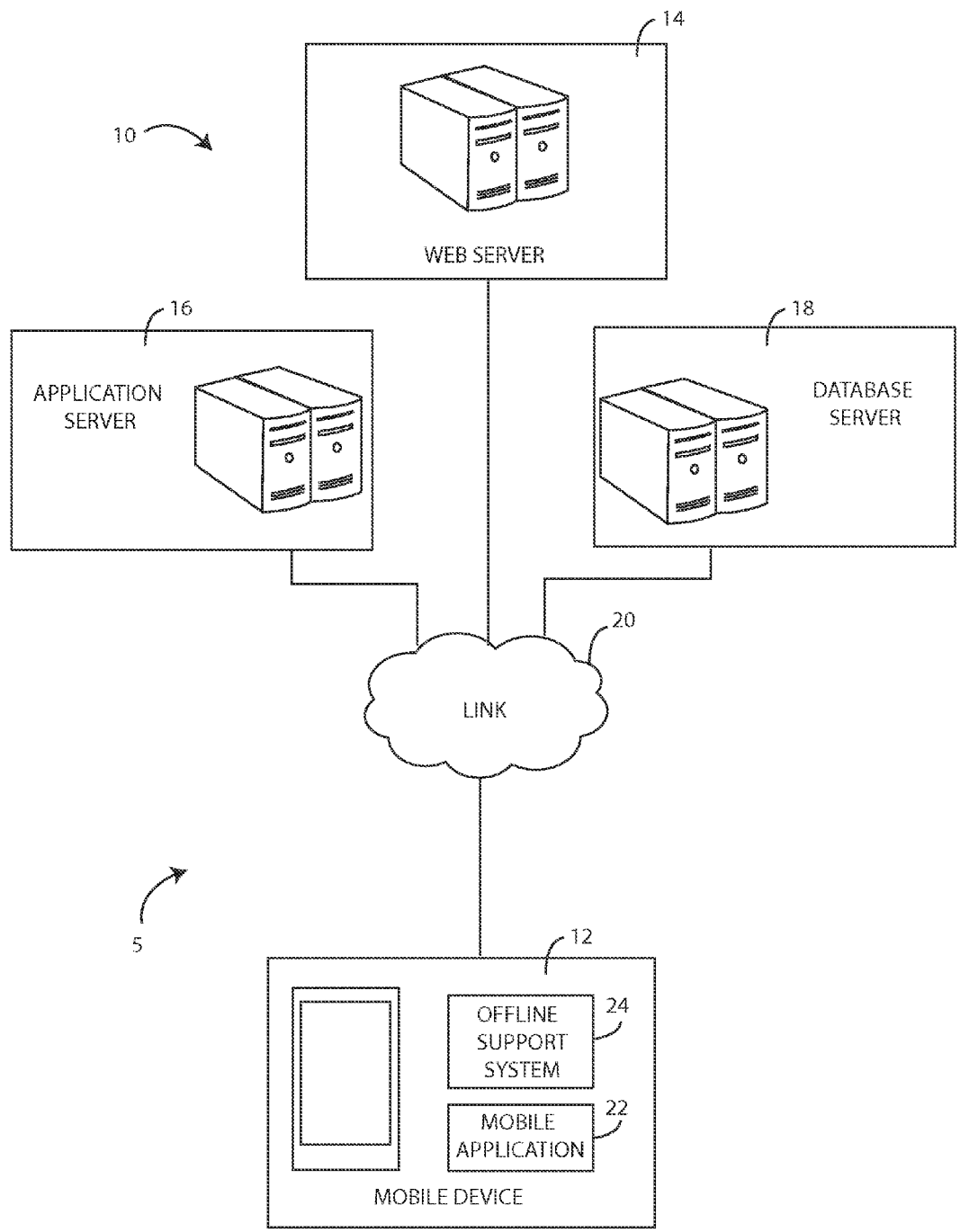
FIG. 1 depicts an environment in which various examples may be implemented.

Environment:

FIG. 1 depicts an environment 5 in which various embodiments, discussed below, may be implemented. Environment 5 includes mobile device 12 in communication with web service 10 made up of web server, 14, application server 16, and database server 18. Mobile device 12 represents generally any computing device capable of interacting with a web service via a wireless data connection. Examples include, but are not limited to, smart phones, tablets, and notebook computers.

Web server 14 represents generally any computing device configured to receive requests and return responses to mobile device 12. In performing this task, web server 14 passes the request to application server 16. Application server 16 represents generally any computing device configured to act on a request from mobile device 12. Such action can include assembling a response to the request. The response may, for example be assembled from data obtained from database server 18. Thus, application server 16, may process a request, and query database server 18. Data base server 18 represents generally any computing device configured to receive and respond to database queries. Ultimately, application server 16 delivers an assembled response to web server 14 to be returned to mobile device 12.

Components 12-18 are shown being connected via link 20. Link 20 represents generally one or more of a cable, wireless, fiber optic, or remote connections via a telecommunication link, an infrared link, a radio frequency link, or any other connectors or systems that provide electronic communication. It is expected that at least the portion of link connecting mobile device 12 is a wireless connection. Link 20 may include, at least in part, an intranet, the Internet, or a combination of both. Link 20 may also include intermediate proxies, routers, switches, load balancers, and the like.

Mobile device 12 is shown to include mobile application 22 and offline support system 24. Mobile application 22 represents generally any application installed on mobile device that when executed is configured to cause mobile device 12 to interact with web service 10. Such interactions include communicating requests with the expectations of responses to be returned from web service 10. The foregoing high level discussion of servers 14-18 and link 20 reveal the importance of link 20 to mobile device 12. If any portion of link 20 fails, mobile application 22 may be prevented from obtaining requested data because the request cannot be delivered, the response cannot be returned, or both. Discussed in more detailed below, offline support system 24 represents generally any combination of hardware and programming configured to provide mobile application 22 with a response when link 20 fails or is otherwise not available.

Figure 2:
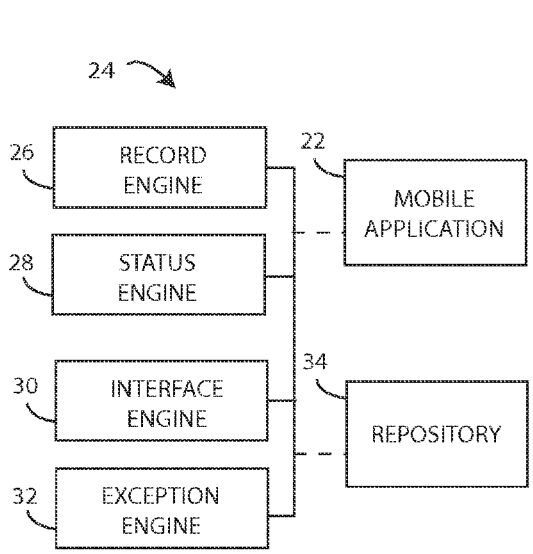
FIGS. 2 and 3 depict physical and logical components for implementing an offline application support system according to an example.

Components:

FIG. 2 depicts an example of physical and logical components for implementing offline support system 24. In FIG. 2, components are identified as engines. In describing the engines below, focus will be on each engine's designated function. However, the term engine, as used herein, refers to a combination of hardware and programming configured to perform a designated function. As is illustrated later with respect to FIG. 3, the hardware of each engine, for example, may include a processor and a memory, while the programming is code stored on that memory and executable by the processor to perform the designated function.

In FIG. 2, offline support system 24 is shown to include record engine 26, status engine 28, interface engine 30, and exception engine 32. Also depicted are mobile application 22 and repository 34. Repository 34 represents any memory capable of use in recording communications between mobile application and a web service such as web service 10 of FIG. 1. Record engine 26 is configured to record a plurality of request/response pairs exchanged between mobile application 22 applications and a web service. In doing so, record engine 26 is responsible for maintaining repository 34. As noted above, mobile application 22 and a web service communicate via requests and responses. A request, for example, is a network communication and may take the form of an HTTP GET operation for retrieving data. A response is a network communication assembled to respond to the request. Thus, the communication between mobile application 22 and the web service can be segmented into corresponding request/response pairs. Record engine 26 is then responsible for matching each response returned from the web service to its corresponding request and adding the resulting pair to repository 34.

Status engine 28 is configured to determine if a current request from mobile application 22 can be communicated from to a web service. Such a determination may be made in a number of manners. For example, status engine 28 may communicate with the operating system or other application on the mobile device to learn if the device has a data connection to a service provider. In some cases, the mobile device may be out of communication range. In other cases, the data connection may have been manually disabled such as when the mobile device on which application 24 is executing has been place in airplane mode.

Upon a negative determination, status engine 28 is responsible for obtaining a previously recorded response to a prior request matching the current request. Here, status engine 28 may use the current request as a key to query repository 34 to identify a request/response pair having a request matching the current request. That identified pair may be the most recently recorded pair having a matching request. In one example, the requests may match if they are directed to identical network addresses. As used here, a network address may be a Uniform Resource Identifier (URI) that identifies the address of the web service as well as the information being requested. With a request response/pair identified, status engine 28 then returns the response from that pair to mobile application 22 as if it were a response to the current request. Thus, rather than a response to the current request, status engine 28 passes a prior response to a previous request as if it were a response to the current request received from the web service. In other words, mobile application 22 treats the prior response as if it were returned from the web service in response to the current request.

A response obtained and returned from repository 34 may not include up to date information. Interface engine 30 is configured to cause the mobile device to display an indicator when status engine 28 upon a determination that the current request cannot be communicated to the web service. The indicator can be any visual indication that the mobile device 22 does not have a data connection that allows direct interaction with the web service. For example, the indicator may be text, an icon, or a color bar layered on top of the mobile application's graphical user interface. The indicator informs the user that the information being presented by mobile application 22 may not be up to dare. Here, that information corresponds to the prior response returned by status engine 28.

Situations may arise when an application developer would not want a prior response to be returned when a data connection is not available. Such may be the case when critical information is being continually updated at the web service. Exception engine 32 is configured to take an action with response to a current request that does not include passing a prior response to the mobile application. Such an action can include allowing the current request to time out or causing a display of an indicator that a requested operation is not available when the mobile device is offline. Here status engine 28 may be configured to determine if a current request includes an exception indicator. An exception indicator is any data in the request that indicates a prior request is not to be returned to mobile application 22. In one example, an exception indicator may be a flag set in the request. In another example, an exception indicator may be implied by the type of request—for example an HTTP POST operation. If the current request cannot be delivered to the web service, and an exception indicator is identified, status engine 28 passes the current request to exception engine 32.

In foregoing discussion various engines were described as combinations of hardware and programming configured to perform a given function. Such engines may be implemented in a number of fashions. Looking at FIG. 3, the programming may be processor executable instructions stored on tangible memory resources 36 while the hardware may include a one or both of memory resource 36 and processing resource 38. Memory resource 36 represents generally any number of memory components capable of storing instructions that can be executed by processing resource 38. Memory resource 36 may be integrated in a single device or distributed across devices. Likewise processing resource 38 represents any number of processors capable of executing instructions stored by memory resource 36. Processing resource 38 may be integrated in a single device or distributed across devices. Further, memory resource 36 may be fully or partially integrated in the same device as processing resource 38 or it may be separate but accessible to that device and processing resource 38. Thus, it is noted that system 24 may be implemented completely or partially by a mobile device.

Thus, in one example, memory resource 36 can be said to store program instructions that together with processor resource 38 implement application system 24 of FIG. 2. Furthermore, the program instructions can be part of an installation package that when installed can be executed by processing resource 38 to implement application system 24. In this case, the memory resource storing the installation package may be a portable medium such as a CD, DVD, or flash drive or a memory maintained by a server from which the installation package can be downloaded and installed.

Figure 3:
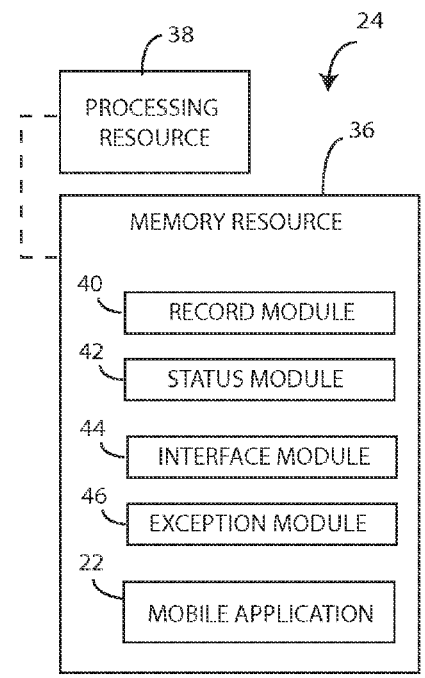

Continuing with FIG. 3, memory resource 36 is shown to include record module 40, status module 42, interface module 44, and exception module 46. Record module 40 represents program instructions that, when executed, cause processing resource 38 to implement record engine 26 of FIG. 2. Status module 42 represents program instructions that when executed cause the implementation of status engine 28. Interface module 44 represents program instructions that when executed cause the implementation of interface engine 30, and exception module 46 represents program instructions that when executed cause the implementation of status exception engine 32.

While in FIG. 3, modules 40-46 are depicted separate from mobile application 22, modules 40-46 may be integrated into mobile application 22. In other implementations, modules 40-42 may be integrated into an operating system or may form a separate standalone program.

Figure 4:
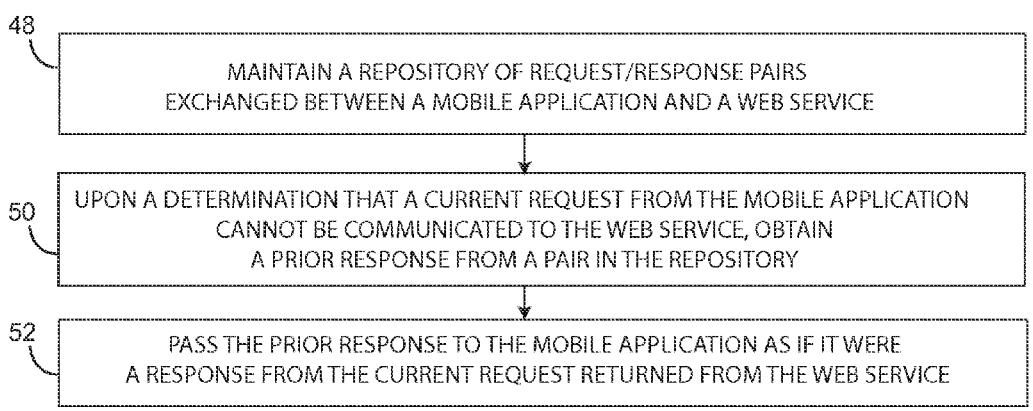
FIG. 4 is a flow diagram depicting steps taken to implement an example.

Operation:

FIG. 4 is a flow diagram of steps taken to implement an offline application support method. In discussing FIG. 4, reference may be made to the diagrams of FIGS. 1-3 to provide contextual examples. Implementation, however, is not limited to those examples. Starting with step 48, a repository maintained. The repository includes a plurality of request/response pairs exchanged between a mobile applications and a web service. Where, for example, a determination is made that the current request can be communicated to the web service, the repository may be updated to include that request and its corresponding response returned from the web service. Referring to FIG. 2, record engine 26 may be responsible for implementing step 48.

Upon a determination that a current request from the mobile application cannot be communicated to the web service, a prior response is obtained from a pair in the repository (step 50). That pair includes a prior request matching the current request. The prior response obtained from the repository is passed to the mobile application as if it were a response from the current request returned from the web service (step 52). Again referring to FIG. 2, status engine 28 may be responsible for implementing steps 50 and 52.

The method depicted in FIG. 4 may be expanded to include causing a display that indicates information being presented by the mobile application may not be current. Such would occur only upon a positive determination in step 50. This information being displayed corresponds to the prior response passed to the mobile application in step 52. Likewise, the method can include causing a display that indicates that the information is current. Here the information corresponds to a current response received from the web service. Referring to FIG. 2, interface engine 30 may be responsible for causing such a display by, for example, causing text, a color bar, or an icon to overlay the user interface being displayed by the mobile application.

The method depicted in FIG. 4 may be expanded to include examining the current request for an exception indicator. Upon the determination that a current request from the mobile application cannot be communicated to the web service, The current request may be passed to an exception handler rather than obtaining and passing the prior response to the mobile application. An exception handler is a program configured to take an action with respect to the current request that does not include passing a prior response to the mobile application. Referring to FIG. 3, exception module 46 may serve as an exception handler.

Figure 5:
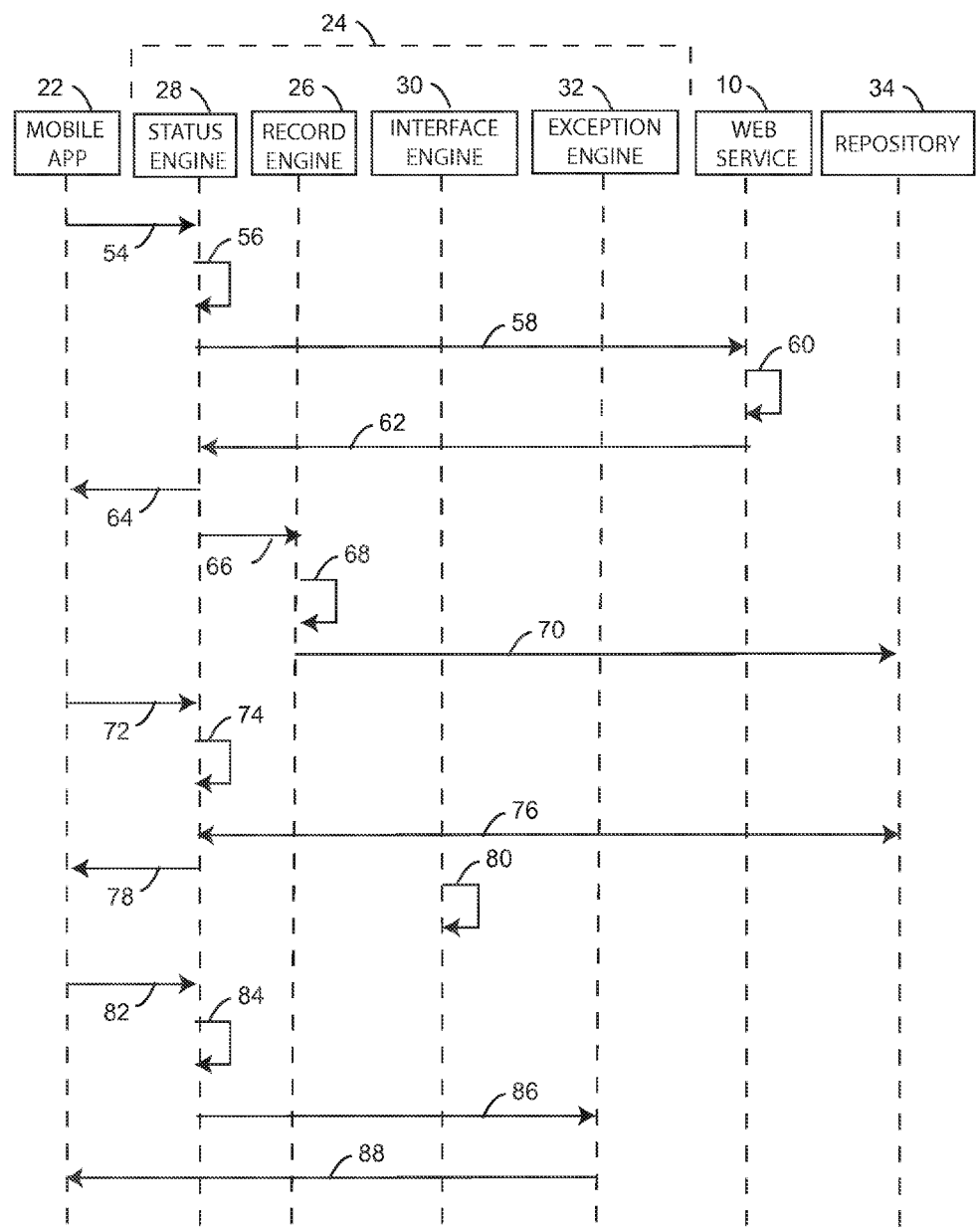
FIG. 5 is a sequence diagram illustrating steps taken to implement an example.

To summarize and provide a contextual overview, FIG. 5 is a sequence diagram illustrating steps taken by the components of environment 5 in FIG. 1 to provide offline support for a mobile application. To start, in this example, mobile application 22 communicates a current request directed to web service 10 (step 54). Status engine 28 intercepts or otherwise obtains the request and determines if the request can be communicated to web service 10 (step 56). Upon a positive determination, the current request is allowed to pass to web service or otherwise not interfered with (step 58). Web service processes the request (step 60) and returns a response that, passing through status engine (step 32), reaches mobile application (step 64). Status engine 28 then communicates copies of the current request and its response to record engine 26 (step 66). Record engine 26 assembles a request/response pair (step 68) and updates repository 30 (step 70).

Later, mobile application 22 communicates another request directed to web service 10 (step 72). Again, status engine 28 intercepts or otherwise obtains that subsequent request and determines if the request can be communicated to web service 10 (step 74). Here, a data connection is not available, so status engine 28 uses the request as a key for querying repository 34. As a result, status engine 28 obtains a prior response returned from web service 10 in response to a prior matching request (step 76). Status engine 28 then passes that prior response to mobile application 22 as if it were a response received from web service 10 returned in response to the request of step 72 (step 78). Interface engine 30 causes a display of an indicator reflecting that information being displayed as a result of the prior response may not be current (step 80).

Later, mobile application 22 communicates yet another request directed to web service 10 (step 82), and again, status engine 28 intercepts or otherwise obtains that subsequent request and determines if the request can be communicated to web service 10 (step 84). Again, a data connection is not available, but here status engine 28, in step 84, also examines the request and identifies an exception indicator and, as a result, passes the request to exception engine 32 (step 86). Exception engine 32 then takes an action that does not include passing a prior response to mobile application 22 (step 88).

Conclusion:

FIGS. 1-3 aid in depicting the architecture, functionality, and operation of various embodiments. In particular, FIGS. 2-3 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each such component or various combinations thereof may represent a circuit or a number of interconnected circuits to implement the specified logical function(s).

Embodiments can be realized in any non-transitory computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any non-transitory media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, solid state devices (SSDs), and portable compact discs.

Although the flow and sequence diagrams of FIG. 4-5 show specific orders of execution, the orders of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. An offline application support system comprising a non-transitory computer readable resource storing instructions that, when executed, cause a processing resource to:
   record in a repository a plurality of request/response pairs exchanged between the application and a web service, the repository searchable using a current request from the application to the web service as a key;
   determine if a data connection exists to allow the current request from the application to be communicated to the web service;
   upon a positive determination:
      pass the current request to the web service; and
      update the repository to include a request response pair for the current request and its corresponding response; and
   upon a negative determination:
      examine the current request for an exception indicator indicating that no recorded request/response pair is to be returned to the application, the exception indicator being at least one of includes at least one of a flag included in the request and a type of the request;
      if the examination does not identify the exception indicator in the current request, identify a most recent recorded request/response pair having a request matching the current request and passing the response from the identified pair to the application as if the response from the identified pair were a response to the current request; and
      if the examination does identify the exception indicator in the current request, pass the current request to an exception handler rather than obtaining and passing the response from the identified pair to the application.

2. The system of claim 1, wherein the instructions that, when executed, cause the processing resource to pass the response from the identified pair to the application comprise instructions that, when executed, cause the processing resource to pass the prior response to the application as if the prior response were a response from the current request returned from the web service and cause a display that indicates a possibility that information being presented by the application is not current, the information corresponding to the prior response.

3. The system of claim 1 wherein the instructions, when executed, cause the processing resource to, upon a negative determination, utilize the current request as a key to search for a request response pair and, if a pair is not found, pass the current request to the exception handler.

4. The system of claim 1, further comprising the processing resource.

5. The system of claim 1, wherein the exception indicator indicates that no recorded request/response pair is to be returned in response to a HTTP POST operation.

6. The system of claim 1, wherein the offline application support system is included in a mobile device.

7. A system comprising a status engine, a record engine, and an exception engine wherein:
   the status engine is to determine if a data connection exists to allow a current application request to be communicated from a mobile application to a web service and upon a negative determination obtain a previously recorded response to a prior request matching the current request and passing the previously recorded response to the mobile application as if it were a response to the current request;
   the record engine is to, following a positive determination by the status engine, record the current request and its corresponding response such that the status engine can later return that response to a future request from the mobile application; and
   the exception engine is to take an action with response to a current request that does not include passing a prior response to the mobile application,
   wherein the status engine is to, upon the negative determination, pass the current request to the exception engine rather than obtain and pass the previously recorded response to the mobile application if an examination of the current request identifies an exception indicator, the exception indicator being at least one of a flag included in the request and a type of the request, the exception indicator indicating that no recorded response is to be returned for the current request,
   wherein the status engine, the record engine, and the exception engine each comprise at least one hardware component,
   wherein the record engine is to record request/response pairs exchanged between the mobile application and the web service in a repository searchable using the current request from the mobile application to the web service as a key, and
   wherein the status engine is to obtain the previously recorded response by using the current request as a key for use in identifying a most recent request/response pair in the repository having a request matching the key.

8. The system of claim 7, comprising an interface engine configured, upon the negative determination by the status engine, to cause a display that indicates a possibility that information being presented by the mobile application is not current, the information corresponding to the prior response.

9. The system of claim 7, wherein the exception indicator indicates that no recorded response is to be returned for a HTTP POST operation.

10. The system of claim 7, wherein the at least one hardware component includes at least one of a processor and a memory.

11. The system of claim 7, wherein the status engine, the record engine, the exception engine, and the mobile application are included in a mobile device.

12. The system of claim 11, wherein the repository is included in the mobile device.

13. An offline support method for a mobile application, comprising:
   maintaining a repository of request/response pairs exchanged between a mobile application and a web service, wherein the repository is searchable using a current request from the mobile application to the web service as a key;
   upon a determination that a data connection exists to allow the current request from the mobile application to be communicated to the web service, updating the repository to include a request response pair for the current request and a response from the web service to the current request; and
   upon a determination that the data connection does not exist to allow the current request from the mobile application to be communicated to the web service:

examining the current request for an exception indicator indicating that no pair from the repository is to be returned to the application, the exception indicator being at least one a flag included in the current request and a type of the current request;

if examining does not identify the exception indicator, obtaining a prior response from a pair in the repository, the pair including a past request matching the current request, passing the prior response to the mobile application as if the response from the identified pair were a response from the current request returned from the web service; and if examining does identify the exception indicator, passing the current request to an exception handler rather than obtaining and passing the prior response to the mobile application.

14. The method of claim 13, wherein passing comprises passing the prior response to the mobile application as if it were a response from the current request returned from the web service and causing a display that indicates a possibility that information being presented by the mobile application is not current, the information corresponding to the prior response.

15. The method of claim 13, comprising causing a display that indicates that information being presented by the mobile application is current, the information corresponding to a response to the current request received from the web service.

16. The method of claim 13, wherein the exception indicator indicates that no pair from the repository is to be returned in response to a HTTP POST operation.

17. The method of claim 13, wherein the repository of request/response pairs and the mobile application are included in a mobile device.

* * * * *